United States Patent Office 3,660,471
Patented May 2, 1972

3,660,471
PROCESS FOR PREPARATION OF
SULPHONIC ACIDS
Toshimi Sawano, Osaka-fu, Hiroshi Koike, Takatsuki-shi, Naoji Kurata, Nishinomiya-shi, and Yukio Okuda, Toyonaka-shi, Japan, assignors to Nippon Shokubai Kagaku Kogyo Co. Ltd., Osaka, Japan
No Drawing. Filed Oct. 28, 1968, Ser. No. 771,371
Claims priority, application Japan, Nov. 4, 1967, 42/70,666
Int. Cl. C07c *143/02*
U.S. Cl. 260—513 R    2 Claims

ABSTRACT OF THE DISCLOSURE

A process for preparation of monosulphonic acids at high selectivity which comprises reacting straight-chain paraffinic hydrocarbons having 10 to 30 carbon atoms with sulphur dioxide and oxygen to produce the corresponding sulphonic acids, characterised in that the reaction is carried out under such conditions as to bring about a homogeneous reaction liquid phase, i.e., the concentration of sulphur dioxide in the reaction liquid phase being 7 to 23% by weight, the reaction temperature being 17 to 37° C., and the conversion of the straight-chain paraffinic hydrocarbon being 1 to 7%.

---

This invention relates to a process for preparation of sulphonic acids, and particularly to a process for preparation of organic sulphonic acids by reacting straight-chain paraffinic hydrocarbons directly with sulphur dioxide and oxygen. More particularly, it relates to a process for preparation of monosulphonic acids at high selectivity by reacting straight-chain paraffinic hydrocarbons directly with sulphur dioxide and oxygen.

If a relatively low-molecular-weight paraffinic hydrocarbon such as cyclohexane and n-heptane is used as a starting material in the preparation of sulphonic acids by reacting the paraffinic hydrocarbon directly with sulphur dioxide and oxygen, disulphonic acids are formed in a small ratio as compared with monosulphonic acids. But when a high-molecular-weight paraffinic hydrocarbon having 10–30 carbon atoms is employed as the starting material, polysulphonic acids such as disulphonic acids and trisulphonic acids result in greater ratios than monosulphonic acids, and it is difficult to obtain monosulphonic acids at high selectivity. Special contrivance is therefore necessary to obtain monosulphonic acids at high selectivity.

Various methods have been proposed so far in an attempt to achieve this end. They can be roughly divided into the following three groups.

(A) Methods wherein ultraviolet ray is irradiated in the presence of water in the reaction system. (Japanese Pat. 166,911 and German Pat. 910,165)
(B) Methods wherein the product is extracted from the reaction system by water or other solvent. [German Pat. 840,093, Japanese Pat. 166,691, L. Orthner, Angewandte Chemie, 62, 302–305 (1950), A. Singer, Erdöl und Kohle, 18, 273–281 (1965), and European Chemical News, Normal Paraffin Supplement, 36–40, Dec. 2, 1966]
(C) Method wherein a multi-stage reaction vessel is used, (Belgian Pat. 673,121)

These methods, however, have defects as mentioned below, and are not satisfactory.

According to the methods (A), persulphonic acids formed by ultraviolet ray react with water in a very short period of time, and therefore, monosulphonic acids are obtained at high selectivity. But on the other hand, the free radical chain reaction is rapidly terminated by water, and because of this, it is necessary to irradiate with ultraviolet ray all throughout the reaction, and a complicated apparatus is needed. Thus, these methods are not free from economical disadvantages.

According to the methods (B), the selectivity of monosulphonic acid is fairly good, but is somewhat lower than that according to the methods (A). In addition, they have a defect that the rate of reaction is slow.

Method (C) is a commonplace method in which a multi-staged reactor is used in order to obtain maximum uniformity in the residence time in the reactor, that is, to bring about an approximation to the piston flow, when a product in a liquid phase reaction is prone to undergo a staircase reaction. But since in this reaction, the liquid phase is not homogeneous, the method does not give a satisfactory result, and the selectivity of monosulphonic acid is substantially low.

Accordingly, an object of this invention is to provide a process for preparation of monosulphonic acids at satisfactory selectivity. In the sulphoxidation reaction of paraffinic hydrocarbons having 10–30 carbon atoms, amounts of products such as monosulphonic acids, disulphonic acids and trisulphonic acids are not in accord with a theoretical distribution based on a theory of reaction rate established on the assumption of a staircase reaction; but the ratio of polysulphonic acids formed to monosulphonic acid is extraordinarily large. A reason for this is considered to be that the sulphoxidation reaction does not consist of a simple gas-liquid reaction. Under some conditions, the reaction product is separated from an unreacted paraffin hydrocarbon phase, and two phases are formed. It is presumed that since the product phase—generally called "oil"—contains a large amount of persulphonic acid dissolved therein, monosulphonic acid is attacked by the persulphonic acid in the product phase, and is rapidly changed into polysulphonic acids. It is assumed furthermore that when sulphur dioxide is used in a great quantity such as to bring about the separation of the reaction liquid phase into two or three phases, part of sulphonic acid and persulphonic acid is extracted with liquid sulphur dioxide and the same reaction as mentioned above occurs in the sulphur dioxide phase, resulting in the formation of great quantities of polysulphonic acids.

Based on these conjectures, we have found that the foregoing object of the invention is achieved by conducting the above-mentioned reaction while maintaining the reaction system in a homogeneous or nearly homogeneous liquid phase with the use of an optimum amount of sulphur dioxide so that the reaction product—mainly monosulphonic acid although strictly speaking, it consists of persulphonic acid, monosulphonic acid, polysulphonic acid and sulphuric acid—may hardly be separated from a phase of unreacted paraffinic hydrocarbons in the reaction system.

The conditions for maintaining the reaction system in a homogeneous or nearly homogeneous liquid phase in the invention are specifically described below.

The reaction temperature is 17 to 37° C., preferably 20 to 35° C. The concentration of sulphur dioxide in the reaction liquid phase is 7 to 23% by weight, preferably 10 to 20% by weight. The partial oxygen pressure may vary within the range of 0.1 to 20 kg./cm.² gauge (gauge pressure is meant throughout the specification), but preferably 1–5 kg./cm.². In order to limit the concentration of the reaction product in the reaction system, it is preferable to adjust the conversion of straight-chain paraffinic hydrocarbon to 1–7%. Especially, it is necessary to control the reaction temperature since the ratio of mono- to di- and tri- increases when the reaction temperature becomes much higher than the preferable temperature.

The straight-chain hydrocarbons used as the starting materials in the invention are straight-chain paraffinic hydrocarbons having 10–30, preferably 13–25, especially preferably, 14–18, carbon atoms. It is preferred that such paraffinic hydrocarbon should have an aromatic hydrocarbon content of not more than 0.5% by weight, an olefinic hydrocarbon content of not more than 2.5% by weight, and an isoparaffinic hydrocarbon content of not more than 10.0% by weight.

In addition to a high selectivity of monosulphonic acids, the homogeneous liquid phase reaction of the invention is characterised by the preparation of the final product in a high space time yield because the rate of reaction is higher than that in ordinary methods. The high rate of reaction is due probably to the accelerating effect of a free radical chain reaction by the solvation effect which is peculiar to liquid sulphur dioxide, since sulphur dioxide is present in the reaction system in a large and optimum amount.

The reaction mixture obtained by conducting the reaction under the above-mentioned conditions is then treated with water or a water-containing solvent such as a mixture of water and methanol, ethanol or isopropanol. This treatment gives the intended monosulphonic acids at high selectivity. This treatment itself is known as one intended for decomposition of persulphonic acid and extraction of sulphonic acid. According to the present invention, an amount of water of a water-containing solvent used as 1 to 20% by weight, preferably 3 to 15% by weight, based on the reaction mixture.

In the present invention, a suitable initiating means or initiator may be applied for the initiation of reaction. For instance, it is preferable to irradiate ultraviolet ray or high energy radioactive ray to the reaction system, or to add halogen, ozone, carboxylic acids, carboxylic anhydrides, azo compounds or organic peroxides to the reaction system. If appropriate conditions are chosen, it is possible to initiate the reaction without using such an initiating means or initiator.

The reaction according to the invention may be carried out either batchwise or continuously.

The process of the invention will be described in more detail by the following examples which are not intended to be limitative.

EXAMPLES 1 to 12

In each run, 250 ml. of a straight-chain paraffinic hydrocarbon with 14–18 carbon atoms containing 0.01% by weight of an aromatic hydrocarbon and 0.2% by weight of an olefinic hydrocarbon was charged into a 500 ml. autoclave provided with a stirrer, a pressure gauge, an inlet for sulphur dioxide and an inlet for oxygen. Oxygen was introduced at a partial pressure as indicated in Table 1, and sulphur dioxide was introduced so that the concentration of it in the reaction liquid phase was as indicated in Table 1. The reaction was conducted with the liquid phase being homogeneous. After the reaction, water was added to the reaction mixture, followed by deaeration and the separation of a water layer. Sulphonic acid was obtained from the water layer. The results (Examples 1 to 6) are shown in Table 1.

For the purpose of comparison, the reaction was conducted in the same manner as above except that the reaction conditions were outside the range specified in the present invention and the reaction system was not homogeneous. The results (Examples 77–12) are also shown in Table 1.

TABLE 1

| Example No. | Reaction temperature (° C.) | SO$_2$ concentration in reaction liquid phase (wt. percent) | Partial pressure of oxygen (kg./cm.²) | Conversion of paraffin (percent) | Selectivity (percent) Mono-sulphonic acid | Di-sulphonic acid | Tri-sulphonic acid |
|---|---|---|---|---|---|---|---|
| 1a | 20 | 8.1 | 2.5 | 5.8 | 84.7 | 13.5 | 0.9 |
| 2 | 27 | 13.5 | 4.0 | 3.2 | 89.6 | 6.8 | 1.8 |
| 3 | 30 | 13.9 | 2.8 | 3.8 | 87.5 | 10.8 | 1.7 |
| 4b | 30 | 16.1 | 3.1 | 3.5 | 91.2 | 7.6 | 1.2 |
| 5 | 35 | 17.9 | 1.5 | 2.1 | 94.4 | 5.1 | 0.9 |
| 6 | 35 | 10.6 | 5.0 | 3.6 | 88.0 | 10.7 | 1.3 |
| 7 | 30 | 18.0 | 2.5 | 7.2 | 78.2 | 12.2 | 7.2 |
| 8 | 35 | 6.7 | 4.0 | 3.2 | 75.6 | 19.2 | 5.2 |
| 9 | 40 | 16.3 | 1.8 | 8.5 | 77.3 | 13.5 | 9.2 |
| 10 | 50 | 12.4 | 5.0 | 2.1 | 73.4 | 16.4 | 4.1 |
| 11 | 50 | 23.8 | 2.1 | 8.0 | 65.3 | 18.4 | 16.3 |
| 12 | 50 | 33.6 | 3.5 | 1.8 | 64.4 | 20.8 | 14.8 | a The reaction was initiated by irradiating ultraviolet ray in the early stage of reaction.
b Acetic acid (0.1 g.) was added as an initiator in the early stage of reaction.

EXAMPLES 13 TO 19

The reaction was continuously carried out under a variety of conditions with the use of a 800 ml. cylindrical reactor provided with a stirrer, a pressure gauge, an inlet for paraffinic hydrocarbons, an inlet for sulphur dioxide, an inlet for oxygen and an opening for withdrawal of the reaction mixture.

While maintaining the partial oxygen pressure at 1.5 to 3.0 kg./cm.², a straight-chain paraffinic hydrocarbon with 14 to 17 carbon atoms containing 0.01% by weight of an aromatic hydrocarbon and 0.2% by weight of an olefinic hydrocarbon and sulphur dioxide were continuously fed into the reactor, and the reaction mixture was continuously withdrawn from the withdrawal opening. Because the discharge of gas was not conducted, the concentration of sulphur dioxide in the reaction liquid phase was maintained constant.

In the foregoing examples, except Example 18, an ultraviolet ray or reaction initiator was applied at the early stage of reaction.

The results are shown in Table 2. Example 16 is for comparison purpose.

TABLE 2

| Example No. | Reaction temperature (°C.) | Amount of paraffin fed (g./hr.) | Amount of SO₂ fed (g./hr.) | SO₂ concentration in the reaction liquid phase (wt. percent) | Conversion of paraffin (percent) | Selectivity (percent) | | |
|---|---|---|---|---|---|---|---|---|
| | | | | | | Mono-sulfonic acid | Di-sulfonic acid | Tri-sulfonic acid |
| 13[a] | 25 | 776 | 137 | 15.0 | 4.5 | 86.3 | 10.0 | 3.7 |
| 14[a] | 30 | 931 | 164 | 15.0 | 4.5 | 85.6 | 10.2 | 4.2 |
| 15[a] | 35 | 1,114 | 246 | 15.0 | 4.5 | 81.2 | 13.0 | 5.8 |
| 16[a] | 40 | 1,550 | 516 | 25.0 | 4.5 | 77.2 | 14.8 | 8.0 |
| 17[b] | 25 | 776 | 94 | 10.8 | 2.8 | 88.0 | 9.7 | 2.3 |
| 18[c] | 30 | 931 | 170 | 15.5 | 6.1 | 84.3 | 11.2 | 4.5 |
| 19[d] | 30 | 931 | 171 | 15.5 | 5.5 | 87.3 | 9.8 | 2.4 |

[a] The reaction was initiated by irradiating ultraviolet ray for 30 minutes at the early stage of reaction.
[b] Acetic acid (0.5 g.) was added as an initiator at the early stage of reaction.
[c] The reaction was initiated without any irradition or any additive.
[d] Paraffin feed contained 250 p.p.m. of water. As an initiator 0.5 g. of acetic acid was added in the early stage of reaction.

EXAMPLE 20

This example illustrates a continuous process in which a preliminary reactor and a main reactor are used.

A 50 ml. preliminary reactor equipped with a stirrer was charged with 18 ml. of a straight-chain paraffinic hydrocarbon with 14–17 carbon atoms containing 0.01% by weight of an aromatic hydrocarbon and 0.2% by weight of an olefinic hydrocarbon and 4 ml. (volume at −50° C.) of liquid sulphur dioxide. Oxygen was passed thereinto until the partial pressure reached 3 kg./cm.². A mixture containing a great quantity of persulphonic acid was obtained by heating them for 10 minutes to 50° C.

A 500 ml. main reactor of a cylindrical glass equipped with a stirrer, a pressure gauge, an inlet for a mixture of paraffin and sulphur dioxide and an opening for withdrawal of the reaction mixture at the bottom was charged with 200 ml. of a straight-chain paraffinic hydrocarbon with 14–17 carbon atoms, and oxygen was passed thereinto until the partial pressure reached 2.5 kg./cm.². The temperature was maintained at 30° C., and sulphur dioxide was charged so that its concentration in the reaction phase was 15.7% by weight, followed by stirring. The reaction mixture containing persulphonic acid was fed from the pre-reactor into the main reactor at a rate of 2 ml./min., and simultaneosuly 13 ml./min. of fresh paraffinic hydrocarbon and 1.0 ml./min. of liquid sulphur dioxide were continuously fed into the main reactor.

The reaction mixture was continuously withdrawn from the bottom of the main reactor, and conducted into a vessel containing water. After sufficient stirring, a water layer was separated. Sulphonic acid was obtained from the water layer. During the reaction, the partial pressure of oxygen was maintained at 2.0 kg./cm.², and the concentration of sulphur dioxide in the reaction liquid phase was maintained at about 15.7% by weight. The analysis of the product indicated that the conversion of the paraffin was 4.0%, and the selectivity was 87.3% for monosulphonic acid, 9.9% for disulphonic acid, and 2.8% for trisulphonic acid.

We claim:
1. A process for the preparation of monosulphonic acids having high selectivity which comprises reacting straight-chain paraffinic hydrocarbons having 10 to 30 carbon atoms with sulphur dioxide and oxygen to produce the corresponding sulphonic acid, wherein the concentration of sulphur dioxide in the reaction liquid phase is 10 to 20% by weight, the partial oxygen pressure is 0.1 to 20 kg./cm.² (gauge), the reaction temperature is 20 to 35° C., and the conversion of the straight-chain paraffinic hydrocarbon is 1 to 5% so as to effect a homogeneous liquid phase reaction.

2. A process for the preparation of monosulphonic acids at high selectivity which comprises reacting straight-chain paraffinic hydrocarbons having 13 to 25 carbon atoms with sulfur dioxide and oxygen to produce the corresponding sulphonic acids, wherein the concentration of sulphur dioxide in the reaction liquid phase is 10 to 20% by weight, the partial oxygen pressure is 1 to 5 kg./cm.² (gauge), the reaction temperature is 20 to 35° C., and the conversion of the straight-chain paraffinic hydrocarbon is 1 to 5% so as to effect a homogeneous liquid phase reaction.

References Cited
UNITED STATES PATENTS
3,260,741   7/1966   Mackinnon et al. _____ 260—513

DANIEL D. HORWITZ, Primary Examiner